US008098755B2

(12) United States Patent
Kim et al.

(10) Patent No.: US 8,098,755 B2
(45) Date of Patent: Jan. 17, 2012

(54) METHOD AND SYSTEM FOR BEAMFORMING IN A MULTIPLE USER MULTIPLE INPUT MULTIPLE OUTPUT (MIMO) COMMUNICATION SYSTEM USING A CODEBOOK

(75) Inventors: Joonsuk Kim, San Jose, CA (US); Sirikiat Ariyavisitakul, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 708 days.

(21) Appl. No.: 12/190,272

(22) Filed: Aug. 12, 2008

(65) Prior Publication Data
US 2009/0066577 A1 Mar. 12, 2009

Related U.S. Application Data (60) Provisional application No. 60/970,794, filed on Sep. 7, 2007, provisional application No. 61/073,842, filed on Jun. 19, 2008.

(51) Int. Cl.
*H04B 7/02* (2006.01)
(52) U.S. Cl. ...................................................... 375/267
(58) Field of Classification Search .................. 375/260,
375/265, 267, 285, 295, 299, 316, 346–350,
375/358; 455/69, 101, 500; 370/208, 329,
370/334
See application file for complete search history.

(56) References Cited

U.S. PATENT DOCUMENTS

| 7,489,748 B2* | 2/2009 | Bouvet et al. | 375/346 |
|---|---|---|---|
| 7,505,529 B2* | 3/2009 | Kwak et al. | 375/295 |
| 7,664,200 B2* | 2/2010 | Ariyavisitakul et al. | 375/296 |
| 7,706,469 B2* | 4/2010 | Bandemer et al. | 375/316 |
| 7,869,536 B2* | 1/2011 | Li et al. | 375/267 |
| 2004/0082356 A1 | 4/2004 | Walton | |
| 2006/0203708 A1* | 9/2006 | Sampath et al. | 370/208 |
| 2007/0183362 A1* | 8/2007 | Mondal et al. | 370/329 |
| 2008/0188190 A1* | 8/2008 | Prasad et al. | 455/114.3 |
| 2009/0010359 A1* | 1/2009 | Hwang et al. | 375/297 |

FOREIGN PATENT DOCUMENTS

EP 1 780 925 5/2007

(Continued)

OTHER PUBLICATIONS

Farhang-Boroujeny, B. et al., "Layering Techniques for Space-Time Communication in Multi-User Networks," Vehicular Technology Conference, 2003. VTC 2003-Fall. 2003 IEEE 58th Orlando, FL, USA Oct. 6-9, 2003, Piscataway, NJ, USA, IEEE, US LNKD-DOI:10.1109/VETECF.203.1285240, Oct. 6, 2003, pp. 1339-1343, vol. 2, XP010700858 ISBN: 978-0-7803-7954-1.

(Continued)

*Primary Examiner* — Khanh C Tran
(74) *Attorney, Agent, or Firm* — McAndrews, Held & Malloy, Ltd.

(57) ABSTRACT

A method and system for beamforming in a multiple user multiple input multiple output (MIMO) communication system using a codebook may include a processor in a node B that enables generation of an interference cancellation matrix ($W_R$). The interference cancellation matrix, also referred to as a matched filter, may enable a composite signal (Y) to be represented as a plurality of subsidiary signals ($y_i$), each of which is transmitted by the node B for reception at a corresponding $i^{th}$ UE station. Each of the subsidiary signals $y_i$ may be generated based on a corresponding one of a plurality of data stream signals ($x_i$). The processor may enable generation of a precoding matrix ($W_T$) based on the interference cancellation matrix. A transmitter within the node B may enable generation of a plurality of signals based on the preceding matrix. The signals may be transmitted via a wireless communication medium.

24 Claims, 5 Drawing Sheets

FOREIGN PATENT DOCUMENTS

| | | |
|---|---|---|
| KR | 200789562 | 8/2007 |
| WO | WO 03/041300 | 5/2003 |
| WO | WO 2005/060123 | 6/2005 |

OTHER PUBLICATIONS

EPO Communication dated Oct. 13, 2010 in Application No. 08014993.3-1237 / 2034682.

* cited by examiner

METHOD AND SYSTEM FOR BEAMFORMING IN A MULTIPLE USER MULTIPLE INPUT MULTIPLE OUTPUT (MIMO) COMMUNICATION SYSTEM USING A CODEBOOK

CROSS-REFERENCE TO RELATED APPLICATIONS/INCORPORATION BY REFERENCE

This application makes reference to, claims priority to, and claims the benefit of U.S. Provisional Application Ser. No. 60/970,794 filed Sep. 7, 2007 and U.S. Provisional Application Ser. No. 61/073,842 filed Jun. 19, 2008, which are hereby incorporated herein by reference in their entirety.

FIELD OF THE INVENTION

Certain embodiments of the invention relate to communication networks. More specifically, certain embodiments of the invention relate to a method and system for beamforming in a multiple user multiple input multiple output (MIMO) communication system using a codebook.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. The $3^{rd}$ Generation Partnership Project (3GPP) is a collaboration among telecommunications associations from around the world whose purpose is to develop standards for wireless networks, which meet the demands of the mobile Internet. One of the projects undertaken by the 3GPP toward this end is referred to as the 3GPP long term evolution (3GPP LTE) project. The 3GPP LTE project has a broad set of objectives relating to specifications for data transfer rates and frequency spectrum utilization in wireless communication networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for beamforming in a multiple user multiple input multiple output (MIMO) communication system using a codebook, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for beamforming in a multiple user multiple input multiple output (MIMO) communication system using a codebook. Various embodiments of the invention may be practiced in connection with third generation partnership project (3GPP) long term evolution (LTE) systems. In various embodiments of the invention, a MIMO base station in a wireless communication system may concurrently transmit precoded signals via a plurality of $M_T$ transmitting antennas. The precoded signals may be subsequently processed by utilizing beamforming techniques prior to being transmitted via the plurality of transmitting antennas. In various embodiments of the invention, the precoding and beamforming steps may be combined without loss of generality. The plurality of $M_T$ concurrently transmitted signals may be received at a plurality of K user equipment (UE) stations, each of which may receive the signals via a plurality of $M_R$ receiving antennas. The transmitted signals may be precoded based on feedback data received from each of the UE stations.

At the receiving end, each of the UE stations may utilize an interference cancellation filter to selectively receive portions of the precoded signals while rejecting other portions of the precoded signals. The filtering characteristics for the interference cancellation filter at each UE station may be determined based on data received from the base station. In various embodiments of the invention, the interference cancellation filter utilized by an $i^{th}$ UE station (among the K UE stations) may enable the UE station to transform the signals received from the base station to a plurality of K signals. The UE station may select the $i^{th}$ signal among the plurality of K signals for further processing while rejecting signals $j \neq i$.

Figure 1:
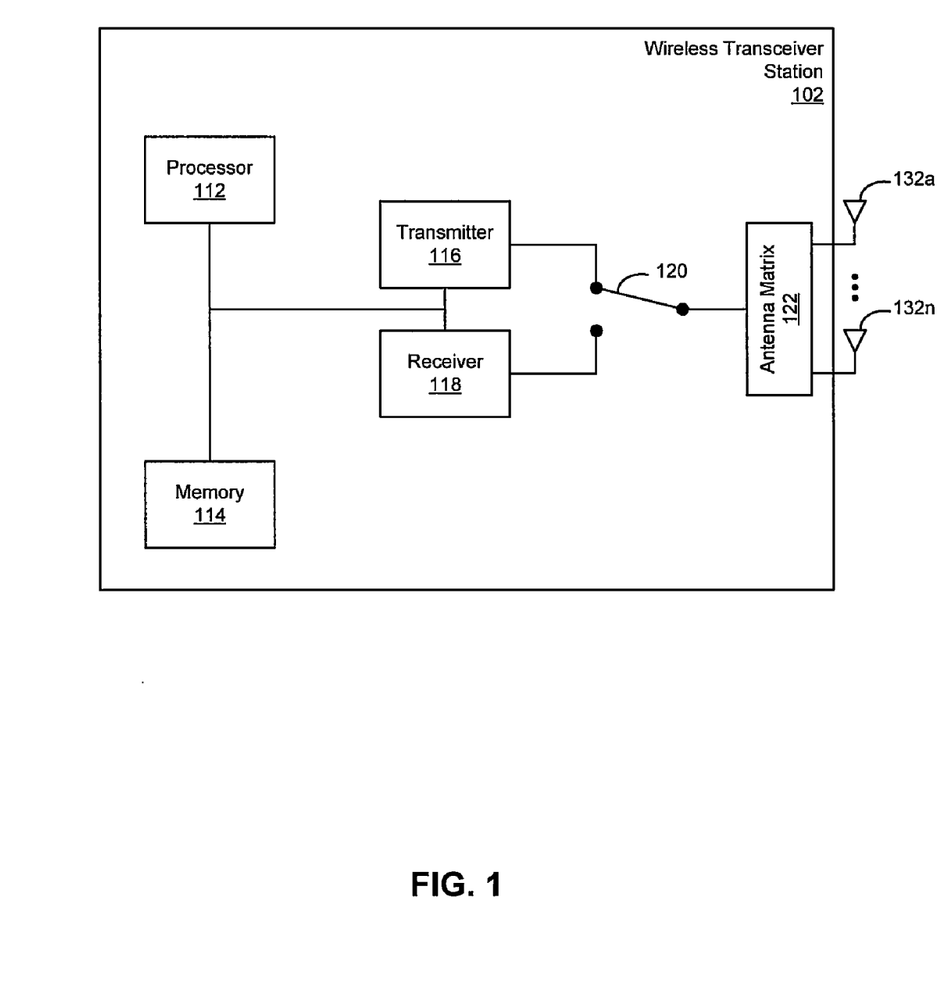
FIG. 1 is a block diagram of an exemplary MIMO transceiver, which may be utilized in connection with an embodiment of the invention.

FIG. 1 is a block diagram of an exemplary MIMO transceiver, which may be utilized in connection with an embodiment of the invention. Referring to FIG. 1, there is shown a wireless transceiver station 102 and a plurality of antennas 132a ... 132n. The wireless transceiver station 102 is an exemplary wireless communication device, which may be utilized at a base station or at a UE in a wireless communication system. In an exemplary 3GPP wireless communication system, the base station may be referred to as a node B. The plurality of antennas 132a ... 132n may enable the wireless transceiver station 102 to transmit and/or receive signals, for example radio frequency (RF) signals, via a wireless communication medium. The wireless transceiver station 102 shown in FIG. 1 may also be depicted as comprising one or more transmitting antennas, which are coupled to the transmitter 116 and one or more receiving antennas, which may be coupled to the receiver 118 without loss of generality.

The exemplary wireless transceiver station comprises a processor 112, a memory 114, a transmitter 116, a receiver 118, a transmit and receive (T/R) switch 120 and an antenna matrix 122. The antenna matrix 122 may enable selection of one or more of the antennas 132a . . . 132n for transmitting and/or receiving signals at the wireless transceiver station 102. The T/R switch 120 may enable the antenna matrix 122 to be communicatively coupled to the transmitter 116 or receiver 118. When the T/R switch 120 enables communicative coupling between the transmitter 116 and the antenna matrix 122, the selected antennas 132a . . . 132n may be utilized for transmitting signals. When the T/R switch 120 enables communicative coupling between the receiver 118 and the antenna matrix 122, the selected antennas 132a . . . 132n may be utilized for receiving signals.

The transmitter 116 may enable the generation of signals, which may be transmitted via the selected antennas 132a . . . 132n. The transmitter 116 may generate signals by performing coding functions, signal modulation and/or signal modulation. In various embodiments of the invention, the transmitter 116 may enable generation of signals using precoding and/or beamforming techniques.

The receiver 118 may enable the processing of signals received via the selected antennas 132a . . . 132n. The receiver 118 may generate data based on the received signals by performing signal amplification, signal demodulation and/or decoding functions. In various embodiments of the invention, the receiver 118 may enable generation of data, which may be utilized by the transmitter 116 for preceding and/or beamforming of generated signals.

The processor 112 may enable the generation of transmitted data and/or the processing of received data. The processor 112 may generate data, which is utilized by the transmitter 116 to generate signals. The processor 112 may process data generated by the receiver 118. In various embodiments of the invention in a node B, the processor 112 may process data received by the receiver 118 and generate coefficient data, which may be utilized by the transmitter 116 for preceding and/or beamforming of generated signals. The coefficient data may be stored in the memory 114.

In various embodiments of the invention, in a UE station, the processor 112 may be operable to process data received by the receiver to generate beamforming data and/or channel quality information (CQI). The beamforming data and/or CQI may be stored in the memory 114. The beamforming data and/or CQI may be sent to the transmitter 116 by the processor 112 or the beamforming data and/or CQI may be retrieved from the memory 114 by the transmitter 116. The transmitter 116 may utilize the beamforming data and/or CQI to generate signals, which are transmitted via the transmitting antennas 132a . . . 132n.

Figure 2:
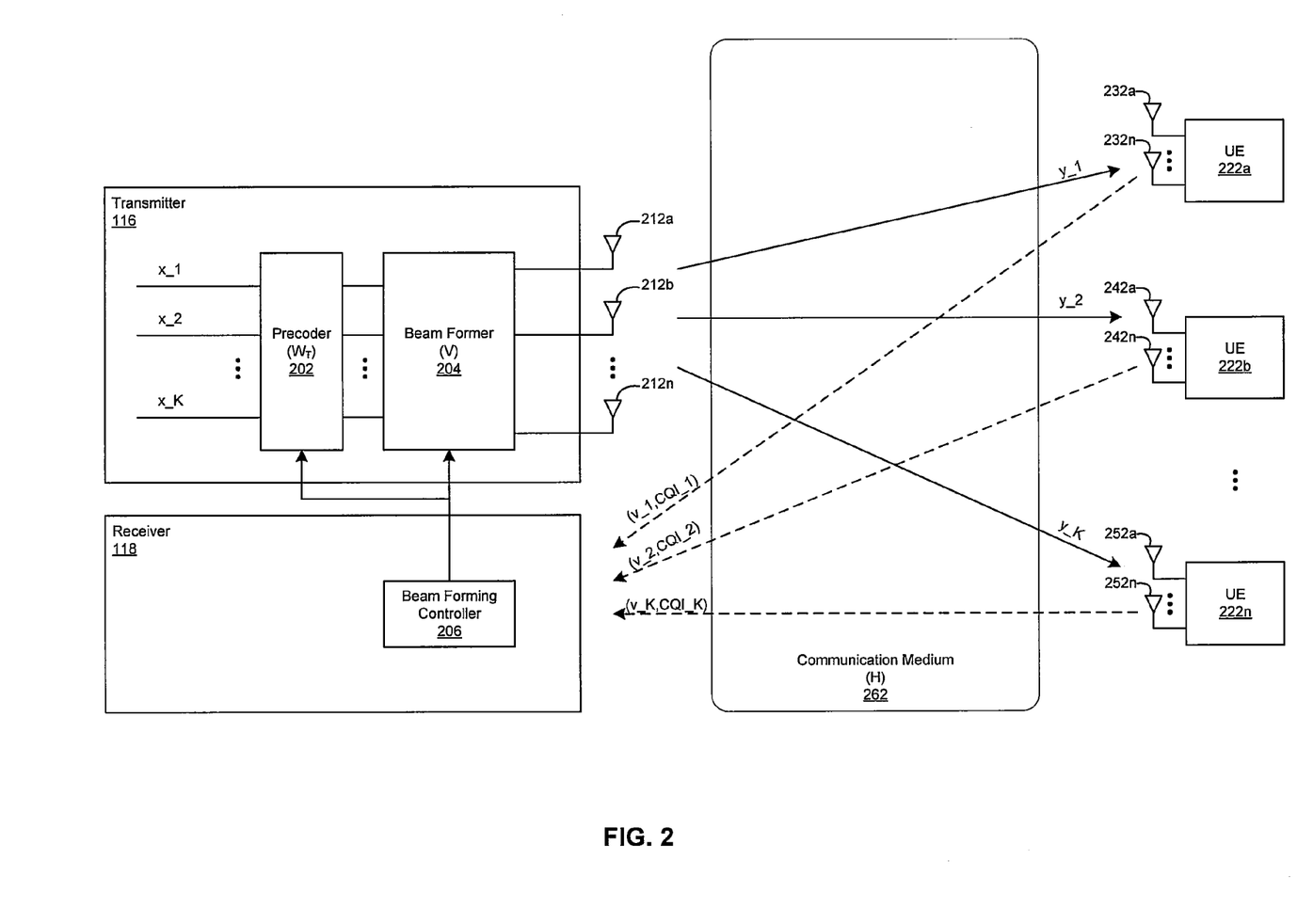
FIG. 2 is a block diagram of an exemplary multiple user MIMO system, which may be utilized in connection with an embodiment of the invention.

FIG. 2 is a block diagram of an exemplary multiple user MIMO system, which may be utilized in connection with an embodiment of the invention. Referring to FIG. 2, there is shown a transmitter 116 (from FIG. 1) with a plurality of transmitting antennas 212a, 212b, . . . , 212n, a receiver 118 (from FIG. 1), a UE station 222a with a plurality of antennas 232a . . . 232n, a UE station 222b with a plurality of antennas 242a . . . 242n, a UE station 222n with a plurality of antennas 252a . . . 252n, and a communication medium 262. The number of UE stations 222a, 222b, . . . , 222n may be represented by the quantity K. The antennas 242a . . . 242n, 242a . . . 242n and/or 252a . . . 252n may be utilized for transmission and/or reception of signals at UE 222a, 222b and 222n, respectively. The number of antennas at each UE may be represented by the quantity $M_R$. However, in various embodiments of the invention, the number of antennas at any given UE may be independently determined. The transmitter 116 may comprise a precoder 202 and a beamformer 204. The receiver 118 may comprise a beamforming controller 206. In various embodiments of the invention, the transmitter 116 and receiver 118 may be components within a node B. The number of transmitting antennas 212a, 212b, . . . , 212n may be represented by the quantity $M_T$.

In various embodiments of the invention the node B may concurrently transmit data streams $x_1, x_2, \ldots, x_K$ to a plurality of K UE stations such that the $i^{th}$ UE is the intended recipient of data stream $x_i$. Each of the data streams may represent $M_S$ spatial streams or space-time streams. In an exemplary embodiment of the invention, $M_S=1$ and each data stream represents a single data stream or space-time stream. The precoder 202 may generate precoded data streams by precoding the transmit data streams $x_1, x_2, \ldots, x_K$ based on a transmitter precoding matrix $W_T$. The beamformer 204 may receive the precoded data streams and generate a plurality of $M_T$ transmitted signals based on a beamforming matrix V. Each of the $M_T$ transmitted signals may be transmitted by a distinct one of the transmitting antennas 212a, 212b, . . . , 212n. The transmitted signals may propagate across the communication medium 262. The amplitude and/or phase of the transmitted signals may be modified as they propagate across the communication medium 262. The signal modification of propagating signals is referred to as fading. The signal fading characteristics of the communication medium 262 may be represented by a channel estimated matrix H. The signals received at UE 222a may be referred to as signal $y_1$, the signals received at UE 222b may be referred to as signal $y_2$ and the signals received at UE 222n may be referred to as signal $y_K$.

The UE 222a may utilize an interference cancellation filter to process the received signal $y_1$ and thereby enable the detection of a received signal $r_1$. The received signal $r_1$ may represent an estimated value for the transmitted data stream $x_1$. The characteristics of the interference cancellation filter utilized at the UE 222a may be represented by the matrix $W_{R1}$. An interference cancellation filter may also be referred to as a "matched filter". The UE 222b may utilize an interference cancellation filter to process the received signal $y_2$ and thereby enable the detection of a received signal $r_2$. The received signal $r_2$ may represent an estimated value for the transmitted data stream $x_2$. The characteristics of the interference cancellation filter utilized at the UE 222b may be represented by the matrix $W_{R2}$. The UE 222n may utilize an interference cancellation filter to process the received signal $y_K$ and thereby enable the detection of a received signal $r_K$. The received signal $r_K$ may represent an estimated value for the transmitted data stream $x_K$. The characteristics of the interference cancellation filter utilized at the UE 222b may be represented by the matrix $W_{RK}$.

Based on the received signal $y_1$, the UE 222a may communicate feedback information to the receiver 118. For example, the received signal $y_1$ may enable the reception of PDUs from the transmitter 116. Each PDU may comprise a preamble field, which enables the UE 222a to generate a beamforming matrix and/or CQI based on the received signal $y_1$. The beamforming matrix may be represented as a matrix $v_1$, and the CQI may be represented as $CQI_1$. The beamforming matrix and CQI may be communicated to the receiver 118 as feedback information ($v_1$, $CQI_1$) via the communication medium 262. The feedback information $(v_1, CQI_1)$ may be communicated within frames (or generally protocol data units (PDU)), which comprise preamble data. The preamble data may enable the node B to compute a user channel matrix, $H_1$, which characterizes the communication medium 262 for signals transmitted by the UE 222a and received at the receiver 118. Similarly, the UE 222b and UE 222n may communicate feedback information, $(v_2, CQI_2)$ and $(v_K, CQI_K)$ respectively, to the receiver 118 via the communication medium 262. Reception of the feedback information in PDUs, which comprise $(v_2, CQI_2)$ and in PDUs, which comprise $(v_K, CQI_K)$ may enable the node B to compute user channel matrices, $H_2$ and $H_K$, which characterizes the communication medium 262 for signals transmitted by the UE 222b and UE 222n, respectively, and received at the receiver 118.

The beamforming controller 206 may receive feedback information $(v_i, CQI_i)$ from one or more UE stations. The beamforming controller 206 may enable the generation of precoding and/or beamforming coefficients, which may be utilized by the precoder 202 and/or beamformer 204 in connection with the precoding matrix $W_T$ and/or the beamforming matrix, V.

In an exemplary embodiment of the invention the signals $y_i$ may be represented as a function of the data streams $x_i$ as follows:

$$\begin{bmatrix} y_1 \\ y_2 \\ \vdots \\ y_K \end{bmatrix} = H \times V \times W_T \times \begin{bmatrix} x_1 \\ x_2 \\ \vdots \\ x_K \end{bmatrix} + \begin{bmatrix} n_1 \\ n_2 \\ \vdots \\ n_K \end{bmatrix} \quad [1]$$

where $y_i$ is a column vector comprising $M_R$ rows (where $M_R$ is the number of antennas utilized at the $i^{th}$ UE station for receiving signals $y_i$), $n_i$ represents signal noise and:

$$H = \begin{bmatrix} H_1 \\ H_2 \\ \vdots \\ H_K \end{bmatrix} \quad [2]$$

where $H_i$ represents a channel estimate matrix (or user channel matrix) for signals $y_i$ received at the $i^{th}$ UE station: and $$V = [v_1 \ v_2 \ \ldots \ v_K] \quad [3]$$

where $v_i$ is a column vector comprising $M_T$ rows (where $M_T$ is the number of transmitting antennas utilized at the node B), which is generated based on a beamforming matrix received from the $i^{th}$ UE station.

The post interference cancellation signals $r_i$ at each UE station may be represented as follows:

$$\begin{bmatrix} r_1 \\ r_2 \\ \vdots \\ r_K \end{bmatrix} = W_R \times H \times V \times W_T \times \begin{bmatrix} x_1 \\ x_2 \\ \vdots \\ x_K \end{bmatrix} + W_R \times \begin{bmatrix} n_1 \\ n_2 \\ \vdots \\ n_K \end{bmatrix} \quad [4]$$

where the matrix $W_R$ is based on the individual matrices $w_{Ri}$ for each UE station.

In various embodiments of the invention, the coefficients in the matrices $W_R$ and $W_T$ may be determined at a node B such that the matrix product $W_R \times H \times V \times W_T$ may at least be approximately represented by an orthogonal matrix. Furthermore, a matrix $V_T$ may be defined. In various embodiments of the invention, the matrix $V_T$ may be defined as a linear combination of the matrices V and $W_T$ as follows:

$$V_T = V \times W_T(CQI) \quad [5]$$

where the node B may generate the preceding matrix $W_T$ based on the CQI feedback from one or more UE stations. In various embodiments of the invention in which the preceding matrix $W_T$ is generated based on CQI feedback, the precoding matrix may be computed wherein different weighting factors may be assigned for different UE stations to enable the node B to concurrently transmit data to a plurality of UE stations at aggregate throughput rates, which may approach the Shannon capacity.

In one approach to determination of the matrices $W_R$ and $W_T$ singular value decomposition (SVD) may be utilized determine matrix $W_R$ after which the matrix $W_T$ may be determined such that the matrix product $W_R \times H \times V \times W_T$ may at least be approximately represented by an orthogonal matrix.

SVD is a method, which enables a matrix, M, to be represented as a matrix product of a diagonal singular matrix, S, a matrix of "output" basis vectors of M, U, and a matrix of "input" basis vectors of M, V:

$$M = U \times S \times V^* \quad [6]$$

where $V^*$ is a conjugate transpose version of the matrix V.

As a first step in the SVD procedure, the data streams $x_i$ may be assumed to each comprise a single spatial stream, or space-time stream ($M_S=1$), the matrix $W_R$ may be represented by the matrix U and the matrix $W_T$ from equation [4] may be, for the time, assumed to be an identity matrix. In this case, equation [4] may be represented as follows:

$$U \times \begin{bmatrix} y_1 \\ y_2 \\ \vdots \\ y_K \end{bmatrix} = U \times H \times V \times \begin{bmatrix} x_1 \\ x_2 \\ \vdots \\ x_K \end{bmatrix} + \begin{bmatrix} \overline{n}_1 \\ \overline{n}_2 \\ \vdots \\ \overline{n}_K \end{bmatrix} \quad [7]$$

The matrix U, which represents the set of matched filters for each of the quantity of K UE stations may be represented as a diagonal matrix for which the matrix component in the $i^{th}$ row may be represented as $u_i$ (i.e. the matched filter for the $i^{th}$ UE station). Consequently, equation [7] may be represented as follows:

$$\begin{bmatrix} u_1^* & 0 & \ldots & 0 \\ 0 & u_2^* & 0 & \vdots \\ \vdots & 0 & \ddots & 0 \\ 0 & 0 & 0 & u_K^* \end{bmatrix} \times \begin{bmatrix} y_1 \\ y_2 \\ \vdots \\ y_K \end{bmatrix} = \begin{bmatrix} u_1^* & 0 & \ldots & 0 \\ 0 & u_2^* & 0 & \vdots \\ \vdots & 0 & \ddots & 0 \\ 0 & 0 & 0 & u_K^* \end{bmatrix} \times \begin{bmatrix} H_1 \\ H_2 \\ \vdots \\ H_K \end{bmatrix} \times \quad [8]$$

$$[v_1 \ v_2 \ \ldots \ v_K] \times \begin{bmatrix} x_1 \\ x_2 \\ \vdots \\ x_K \end{bmatrix} + \begin{bmatrix} \overline{n}_1 \\ \overline{n}_2 \\ \vdots \\ \overline{n}_K \end{bmatrix} =$$

$$\begin{bmatrix} u_1^* \cdot H_1 \cdot v_1 & u_1^* \cdot H_1 \cdot v_2 & \ldots & u_1^* \cdot H_1 \cdot v_K \\ u_2^* \cdot H_2 \cdot v_1 & u_2^* \cdot H_2 \cdot v_2 & \ldots & u_2^* \cdot H_2 \cdot v_K \\ \vdots & \vdots & \ddots & \vdots \\ u_K^* \cdot H_K \cdot v_1 & u_K^* \cdot H_K \cdot v_2 & \ldots & u_K^* \cdot H_K \cdot v_k \end{bmatrix} \times \begin{bmatrix} x_1 \\ x_2 \\ \vdots \\ x_K \end{bmatrix} + \begin{bmatrix} \overline{n}_1 \\ \overline{n}_2 \\ \vdots \\ \overline{n}_K \end{bmatrix}$$

Furthermore, when $M_S=1$, the number of receiving antennas $M_R$ at each UE station 222a, 222b, . . . , 222n may also be equal to one (1). In such case, each user channel matrix, $H_i$, may be represented as a matrix with a matrix rank of one (1). An SVD representation of the user channel matrix $H_i$ may be represented by a single singular value. In this instance, equation [8] may be represented as follows:

$$\begin{bmatrix} u_1^* & 0 & \cdots & 0 \\ 0 & u_2^* & 0 & \vdots \\ \vdots & 0 & \ddots & 0 \\ 0 & 0 & 0 & u_K^* \end{bmatrix} \times \begin{bmatrix} y_1 \\ y_2 \\ \vdots \\ y_K \end{bmatrix} = \begin{bmatrix} \lambda_1 & 0 & \cdots & 0 \\ 0 & \lambda_2 & 0 & \vdots \\ \vdots & 0 & \ddots & 0 \\ 0 & 0 & 0 & \lambda_K \end{bmatrix} \times \quad [9]$$

$$\begin{bmatrix} 1 & \rho_{12} & \cdots & \rho_{1K} \\ \rho_{21} & 1 & \cdots & \rho_{2K} \\ \vdots & \vdots & \ddots & \vdots \\ \rho_{K1} & \rho_{K2} & \cdots & 1 \end{bmatrix} \times \begin{bmatrix} x_1 \\ x_2 \\ \vdots \\ x_K \end{bmatrix} + \begin{bmatrix} \overline{n}_1 \\ \overline{n}_2 \\ \vdots \\ \overline{n}_K \end{bmatrix}$$

where $\lambda_i$ represents the singular value for the matrix $H_i$, $\rho_{ij}=v_i^* \cdot v_j$ and $u_i^*=v_i^{-1}$.

Based on equation [9], when the matrix $W_T$ may be represented as follows:

$$W_T = \begin{bmatrix} 1 & \rho_{12} & \cdots & \rho_{1K} \\ \rho_{21} & 1 & \cdots & \rho_{2K} \\ \vdots & \vdots & \ddots & \vdots \\ \rho_{K1} & \rho_{K2} & \cdots & 1 \end{bmatrix}^{-1} \quad [10a]$$

When represented as a function of CQI, $W_T$ may be represented as follows:

$$W_T(CQI) = \quad [10b]$$

$$\begin{bmatrix} 1 & \rho_{12} & \cdots & \rho_{1K} \\ \rho_{21} & 1 & \cdots & \rho_{2K} \\ \vdots & \vdots & \ddots & \vdots \\ \rho_{K1} & \rho_{K2} & \cdots & 1 \end{bmatrix}^{-1} \times \begin{bmatrix} \alpha_1(CQI_1) & 0 & \cdots & 0 \\ 0 & \alpha_1(CQI_2) & 0 & \vdots \\ \vdots & 0 & \ddots & 0 \\ 0 & \cdots & 0 & \alpha_K(CQI_K) \end{bmatrix}$$

where $\alpha_i(CQI_i)$ refers to the CQI weighting factor for the $i^{th}$ UE station. Equation [10b] presents an example in which the matrix $W_T$ may be generated based on CQI feedback. In instances when $\alpha_i(CQI_i)=\alpha_j(CQI_j)$, the second matrix on the right hand side of equation [10b] may be replaced by an identity matrix.

The matrix product $W_R \times H \times V \times W_T$ may at least be approximately represented by an orthogonal matrix as shown below:

$$W_R \times H \times V \times W_T = \begin{bmatrix} \lambda_1 & 0 & \cdots & 0 \\ 0 & \lambda_2 & 0 & \vdots \\ \vdots & 0 & \ddots & 0 \\ 0 & 0 & 0 & \lambda_K \end{bmatrix} \quad [11]$$

and:

$$V_T = V \times W_T \quad [12]$$

$$= \begin{bmatrix} v_1 & v_2 & \cdots & v_K \end{bmatrix} \times \begin{bmatrix} 1 & \rho_{12} & \cdots & \rho_{1K} \\ \rho_{21} & 1 & \cdots & \rho_{2K} \\ \vdots & \vdots & \ddots & \vdots \\ \rho_{K1} & \rho_{K2} & \cdots & 1 \end{bmatrix}^{-1}$$

where, for illustrative purposes, the CQI weighting factor matrix shown in equation [10b] is represented as an identity matrix.

When each vector $v_i$ is orthogonal to each vector $v_j$ (for $i \neq j$), each product $v_i \cdot v_j = 0$ and the matrix $W_T$, shown in equation [10a], may be represented by an identity matrix. The matrix shown in equation [10a] is referred to as a correlation matrix. After computing the matrix $V_T$ as in equation [12], the node B may communicate the matrix $V_T$ to each UE station.

The matrix $V_T$ may comprise a set of floating point values for each constituent vector $v_{Ti}$, where $v_{Ti}$ may be computed as shown in equation [12] by multiplying the floating point matrix V by the $i^{th}$ column in the floating point matrix $W_T$. In various embodiments of the invention, the quantity of data communicated by the node B to each UE station may be reduced by generated a quantized version of the matrix $V_T$ wherein the quantized version of the matrix $V_T$ may be communicated by the node B to each UE station.

In various embodiments of the invention, coefficient values for the matrix $V_T$ may be selected based on a code book (for example a 3GPP code book) of possible coefficient values. The selected coefficient values for the matrix $V_T$ selected from the code book may represent a quantized version of the coefficients in the matrix $V_T$ as computed in equation [12].

A quantized value $v_i^Q$ may be selected from the code book, which has the highest computed correlation value with the vector $v_{Ti}$ as shown in the following equation:

$$p = \arg(\max(v_{Ti}^* \times v_l^Q)), \text{ where } l=1, 2, \ldots, L \quad [13]$$

where L represents the number of potential quantized values $v_l^Q$ in the code book and l represents an index to a selected candidate quantized value $v_l^Q$ in the code book. The function arg(x) returns a value, which is equal to the angle component in a polar representation of a complex-valued x. In equation [13] the function max(x) indicates that the candidate quantized value $v_l^Q$ for which the correlation value with $V_{Ti}^*$ may be highest (as represented by the product $v_{Ti}^* \times v_l^Q$) may be selected. The value p as computed in equation [13] represents the value l, which may be associated with the highest correlation value (i.e. p represents a code book index value). Consequently, the quantized version of coefficients in the vector $v_{Ti}$ may be represented by $v_p^Q$. The quantized version of the vector $v_{Ti}$, $v_{Ti}^Q$, may be represented as follows:

$$v_{Ti}^Q = v_{p(i)}^Q \quad [14]$$

where p(i) represents the value of p for the $i^{th}$ UE station.

The quantization method disclosed in equation [13], which is based on cordal distance computation, is an exemplary quantization method, which may be utilized in various embodiments of the invention. Various embodiments of the invention, however, are not limited to the quantization method presented of equation [13].

The node B may select a quantized vector $v_{Ti}^Q$ for each UE station. A quantized $V_T^Q$ may be represented as follows:

$$V_T^Q = [v_{T1}^Q v_{T2}^Q \ldots v_{TK}^Q] \quad [15]$$

In various embodiments of the invention the node B may communicate the quantized vectors $[v_{T1}^Q v_{T2}^Q \ldots v_{TK}^Q]$ to each UE station. In one aspect of the invention, the node B may communicate the quantized vectors $[v_{T1}^Q v_{T2}^Q \ldots v_{TK}^Q]$ to each UE station by communicating the set of code book index values p(i) as computed in equation [13] for values i=1,2, . . . , K (where K represents the number of UE stations as described above). For example, the node B may communicate code book index values [p(1) p(2) . . . p(K)] to each of the UE stations.

In general, in instances when the correlation matrix shown in equation [10a] is not an identity matrix, a quantized value is computed for each element in the matrix $V_T$ as shown below:

$$V_T^Q = \text{quantize}\left([v_1 \; v_2 \; \ldots \; v_K^Q] \times \begin{bmatrix} 1 & \rho_{12} & \ldots & \rho_{1K} \\ \rho_{21} & 1 & \ldots & \rho_{2K} \\ \vdots & \vdots & \ddots & \vdots \\ \rho_{K1} & \rho_{K2} & \ldots & 1 \end{bmatrix}^{-1}\right) \quad [16]$$

where, the value for the function quantize ($V \times W_T$) refers to a quantized value for the matrix product $V \times W_T$. In an exemplary embodiment of the invention, the quantize ($V \times W_T$) function may utilize the quantization method as disclosed in equation [13]. For example, the quantized vector $v_{Ti}^Q$ may be computed as shown in the following equation:

$$v_{Ti}^Q = \text{quantize}([v_1^Q v_2^Q \ldots v_K^Q] \times W_{Ti}) \quad [17]$$

where $W_{Ti}$ refers to the $i^{th}$ column in the matrix $W_T$.

An $i^{th}$ UE, may generate a matched filter matrix $W_{Ri}$ based on the set of code book values, $V_T^Q$, received from the node B. The matched filter matrix $W_{Ri}$ may enable the $i^{th}$ UE to selectively receive a data stream $x_i$ from a received signal $y_i$ which also includes contributions from data streams $x_j$ where j≠i. In this regard, the matched filter matrix $W_{Ri}$ may be utilized at the $i^{th}$ UE for interference cancellation filtering of the received signal $y_i$, which was generated by a transmitting node B based on data streams $x_1, x_2, \ldots, x_{M_T}$. At the $i^{th}$ UE, $x_i$ corresponds to the desired data stream for selective reception while data streams $x_j$ (j≠i) correspond to interference.

In various embodiments of the invention an $i^{th}$ UE may generate a matched filter matrix $W_{Ri}$ based on a received set of quantized vectors $[v_{T1}^Q v_{T2}^Q \ldots v_{TK}^Q]$, or other indicia whose values are correlative with the quantized vectors $[v_{T1}^Q v_{T2}^Q \ldots v_{TK}^Q]$. In an exemplary embodiment of the invention as described above, each UE may receive a set of code book values, $V_T^Q$, which are correlative with the set of quantized vectors.

In an exemplary embodiment of the invention, an $i^{th}$ UE may compute a matched filter matrix $W_{Ri}$ as follows:

$$w_{Ri} \times H_i \times [v_{T1}^Q v_{T2}^Q \ldots v_{TK}^Q] = [0 \ldots 0 \; 1_i \; 0 \ldots 0] \quad [18]$$

where the value "1" is located in the $i^{th}$ column of the matrix on the right hand side of equation [18], and:

$$w_{Ri} = [0 \ldots 0 \; 1_i \; 0 \ldots 0] \times (H_i \times [v_{T1}^Q v_{T2}^Q \ldots v_{TK}^Q])^{-1} \quad [19]$$

The matched filter values $W_{Ri}$, computed as shown in equation [19], represent updated matched filter values, which may be computed in response to the quantized values $V_{Tj}^Q$.

In general, in instances when the correlation matrix shown in equation [10a] is not an identity matrix, the UE station may receive a matrix of code book values p(i,j) and generate a quantized matrix $V_T^Q$ as shown in equation [16]. In this case, the matched filter matrix $W_{Ri}$ may be computed based on the quantized matrix $V_T^Q$ in equations [18] and [19] instead of based on a set of quantized vectors $[v_{T1}^Q v_{T2}^Q \ldots v_{TK}^Q]$.

In various embodiments of the invention, an $i^{th}$ UE, may generate a matched filter matrix $w_{Ri}$ when the UE receives a set of floating point values, $V_T$, from the node B by a procedure, which is substantially similar to the procedure described above.

In various embodiments of the invention, an $i^{th}$ UE may reduce the number of operations performed in the computation of the matched filter matrix $W_{Ri}$ by generating a quantized version of a received floating point matrix $V_T$, $V_T^Q$=quantized($V_T$), and generating the matched filter matrix $W_{Ri}$ based on the quantized matrix $V_T^Q$. In this regard, higher performance UEs may generate a matched filter matrix $W_{Ri}$ with greater accuracy by utilizing the floating point matrix $V_T$ while lower performance UEs may generate a matched filter matrix $W_{Ri}$ with lesser accuracy by utilizing the quantized matrix $V_T^Q$.

Various embodiments of the invention may be practiced when $M_S>1$. In such each UE station may utilize $M_R \neq M_S$ antennas. For example, when $M_S=1$, each $\rho_{ij}$ element in the correlation matrix shown in equation [10a] may be represented as a scalar value. When $M_S=2$, each $\rho_{ij}$ element in the correlation matrix shown in equation [10a] may be represented as a 2×2 matrix. Similarly, the user channel matrix, $H_i$, may be represented as a 2×2 diagonal matrix, which comprises two (2) singular values.

Various embodiments of the invention may not be limited to the application of SVD. For example, various embodiments of the invention may also be practiced in connection with geometric mean decomposition (GMD), QR decomposition or minimum mean square error (MMSE) techniques. In an exemplary embodiment of the invention, which utilizes MMSE, the matrix $W_T$ may be represented as follows:

$$W_T = (R + \sigma^2 \cdot \Lambda^{-2})^{-1} \quad [19]$$

where R represents a correlation matrix among vectors $v_i$ and $v_j$, $\sigma^2$ represents noise power associated with the communication medium 262 and $\Lambda^2$ represents signal power for received signals $y_i$. $\Lambda$, which may be represented as a diagonal matrix, may be computed at a node B based on CQI values received as feedback from the UE stations.

Figure 3:
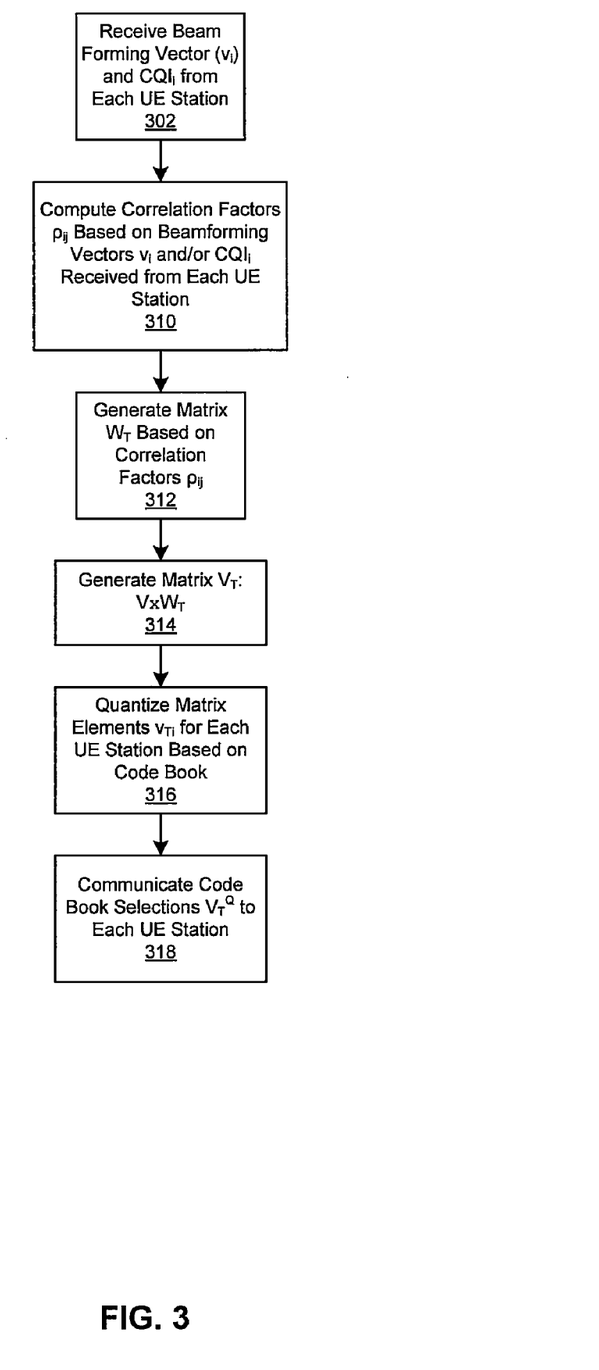
FIG. 3 is a flowchart that illustrates exemplary steps for a node B MIMO design for 3GPP LTE systems, in accordance with an embodiment of the invention.

FIG. 3 is a flowchart that illustrates exemplary steps for a node B MIMO design for 3GPP LTE systems, in accordance with an embodiment of the invention. Referring to FIG. 3, in step 302, the beamforming controller 206 at a node B may receive beamforming vectors $v_i$ and $CQI_i$ from each of a number of K UE station. In step 310, a processor 112 within the node B may enable computation of a plurality of correlation factors, $p_{ij}$, based on the beamforming vectors, $v_i$, and/or $CQI_i$, received from each UE station. In step 312, a precoding filter $W_T$ may be computed based on the correlation factors as shown, for example, in equation [10a]. In step 314, the set beamforming vectors $v_i$ received at step 302 and the preceding filter $W_T$ computed in step 312 may be utilized to compute a modified beamforming matrix $V_T$ as shown in equation [12]. In step 316, the node B may quantize the matrix elements $v_{Ti}$ based on a code book. In step 318, the set of code book selections $V_T^Q$ may be communicated from the transmitter 116 located in the node B to each of the number of K UE stations.

Figure 4:
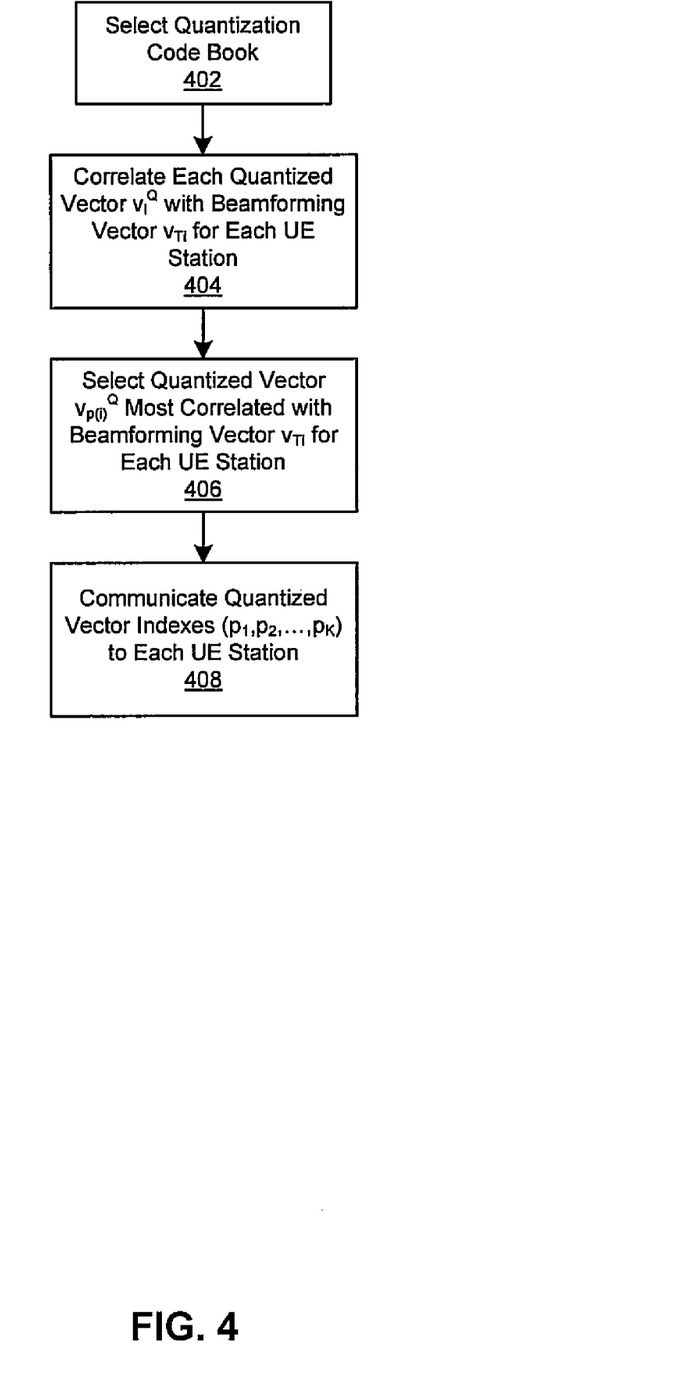
FIG. 4 is a flowchart that illustrates exemplary steps for selecting quantized beamforming vectors from a code book, in accordance with an embodiment of the invention.

FIG. 4 is a flowchart that illustrates exemplary steps for selecting quantized beamforming vectors from a code book, in accordance with an embodiment of the invention. FIG. 4 refers to steps 316 and 318 in FIG. 3. Referring to FIG. 4, in step 402, the processor 112 may select a code book from which quantized values may be selected. The code book may comprise a set of L quantized vectors $v_i^Q$. In step 404, a correlation value may be generated between the beamforming vector $v_{Ti}$ and each quantized vector $v_l^Q$ selected from the code book. Correlation values may be computed for each of the number of K UE stations. In step 406, the node B may select the quantized vector $v_{p(i)}^Q$ that is most correlated with the beamforming vector $v_{Ti}$ for each UE station as shown in equation [13]. In step 408, the node B may communicate the set of code book indexes ($p_1, p_2, \ldots, p_K$) to each UE station.

Figure 5:
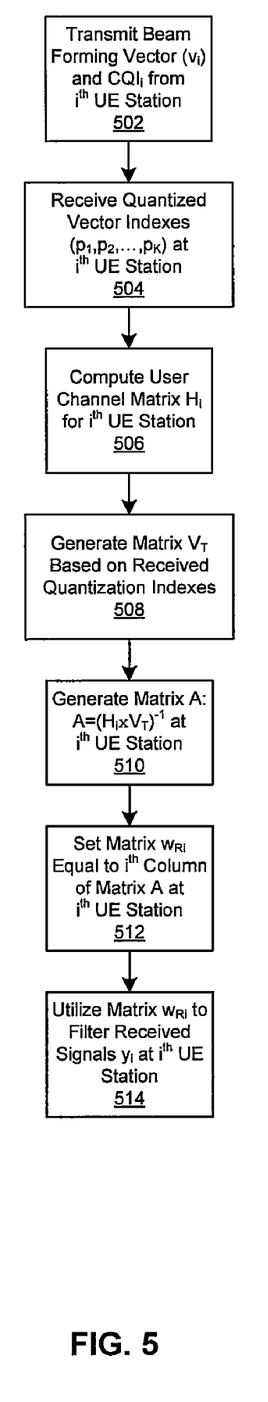
FIG. 5 is a flowchart that illustrates exemplary steps for a UE station MIMO design for 3GPP LTE systems, in accordance with an embodiment of the invention.

FIG. 5 is a flowchart that illustrates exemplary steps for a UE station MIMO design for 3GPP LTE systems, in accordance with an embodiment of the invention. Referring to FIG. 5, in step 502, the $i^{th}$ UE station may transmit a beamforming vector $v_i$ and $CQI_i$ to the node B. In step 504, the $i^{th}$ UE station may receive a set of code book indexes ($p_1, p_2, \ldots, p_K$) from the node B. In step 506, the $i^{th}$ UE station may compute a user channel matrix $H_i$. The user channel matrix may be computed based on preamble data communicated via received signals $y_i$. In step 508, the UE station may generate a matrix $V_T$ based on the received quantization indexes ($p_i, p_2, \ldots, p_K$) and the beamforming vector $v_i$ utilized at the $i^{th}$ UE station. In step 510, $i^{th}$ UE station may generate an inverse matrix product based on matrices $H_i$ and $V_T$. In step 512, the matched filter matrix $W_{Ri}$ for the $i^{th}$ UE station may be determined by selecting the $i^{th}$ column from the inverse matrix product computed in step 510. In step 514, the $i^{th}$ UE station may utilize the matched filter matrix $W_{Ri}$ to filter received signals $y_i$. The matched filter $W_{Ri}$ may enable the $i^{th}$ UE station to selectively receive data stream $x_i$ from a received signal $y_i$ which comprises contributions from a plurality of data streams ($x_1, x_2, \ldots, x_K$).

A method and system for a MIMO design for 3GPP LTE systems may comprise a processor 112 in a node B 102 that enables generation of an interference cancellation matrix ($W_R$). The interference cancellation matrix, also referred to as a matched filter, may enable a composite signal (Y) to be represented as a plurality of subsidiary signals ($y_i$), each of which may be transmitted by the node B for reception at a corresponding $i^{th}$ UE station 222. Each of the subsidiary signals $y_i$ may be generated at the node B based on a corresponding one of a plurality of data stream signals ($x_i$). The ability to decompose a composite signal Y into a plurality of signals $y_i(x_i)$ based on the interference cancellation matrix $W_R$ may be referred to as an orthogonality condition. In an exemplary embodiment of the invention, the interference cancellation matrix $W_R$ may be represented as shown in equation [8]. A matched filter $w_{Ri}$, which may be a component in the interference cancellation matrix $W_R$, may enable the $i^{th}$ UE station 222 to selectively receive signal $y_i$ from the composite signal Y. Selective reception of the signal $y_i$ may enable the $i^{th}$ UE station 222 to decode the data stream $x_i$ while rejecting interference from signals $y_j$ ($j \ne i$).

The processor 112 may enable generation of a precoding matrix ($W_T$) based on the interference cancellation matrix. A transmitter 116 within the node B 102 may enable generation of a plurality of signals based on the precoding matrix. The plurality of signals may be generated based on the data stream signals $x_i$ on a modified beamforming matrix ($V_T$), which may be generated by a precoder 202 and a beamformer 204. The generated plurality of signals may be transmitted by a plurality of transmitting antennas 212a, 212b, ..., 212n via a wireless communication medium 262.

The processor 112 may enable generation of the modified beamforming matrix $V_T$ based on the preceding matrix $W_T$ and a generated beamforming matrix (V) as shown in equation [12]. In an exemplary embodiment of the invention, the precoding matrix $W_T$ may be computed as shown in equation [10a] and is referred to as a correlation matrix. The beamforming matrix V and/or one or more user channel matrices ($H_i$) may be generated based on signals received via the wireless communication medium 262. A beamforming controller 206 in a node B receiver 118 may enable reception of one or more user beamforming matrices ($v_i$) and/or user channel quality information ($CQI_i$) via the received signals. The signals may be received from one or more UE stations 222 as shown in FIG. 2. The preceding matrix $W_T$ and/or beamforming matrix V may be generated based on the user beamforming matrices and/or user channel quality information.

Data from the modified beamforming matrix $V_T$ may be transmitted by the plurality of antennas 212a, 212b, ..., 212n via the wireless communication medium 262. The processor 112 within the node B 102 may enable generation of a quantized version of the modified beamforming matrix $V_T$ ($V_T^Q$) based on a code book. The plurality of transmitting antennas 212a, 212b, ..., 212n may enable transmission of data from the quantized matrix $V_T^Q$ via the wireless communication medium 262.

The processor 112 may enable generation of the quantized matrix $V_T^Q$ by computing a correlation value between each element in the modified beamforming matrix $V_T$ and each entry value within the code book as shown in equation [13]. The quantized matrix $V_T^Q$ may be generated based on a computed maximum value for each of the matrix elements as shown in equation [13]. An index value (p), which references a selected entry value within the code book, may be computed for each of the matrix element based on the plurality of maximum values computed as shown in equation [13]. The plurality of transmitting antennas 212a, 212b, ..., 212n may enable transmission of the plurality of index values via the wireless communication medium 262.

Another embodiment of the invention may provide a machine-readable storage, having stored thereon, a computer program having at least one code section executable by a machine, thereby causing the machine to perform the steps as described herein for beamforming in a multiple user multiple input multiple output (MIMO) communication system using a codebook.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present inven-

What is claimed is:

1. A system for communicating information in a wireless communication system, the system comprising:
one or more circuits operable to generate an interference cancellation matrix that enables a composite signal to be represented as a plurality of subsidiary signals, wherein the plurality of subsidiary signals corresponds to a plurality of data stream signals;
the one or more circuits are operable to generate a precoding matrix based on the generated interference cancellation matrix;
the one or more circuits are operable to generate a plurality of signals for transmission based on the generated precoding matrix and based on the plurality of data stream signals; and
the one or more circuits are operable to transmit the generated plurality of signals via a wireless communication medium.

2. The system according to claim 1, wherein the one or more circuits are operable to generate a modified beamforming matrix based on the generated precoding matrix and a generated beamforming matrix.

3. The system according to claim 2, wherein the one or more circuits are operable to generate the generated beamforming matrix and one or more user channel matrices based on signals received via the wireless communication medium.

4. The system according to claim 3, wherein the one or more circuits are operable to receive one or more user beamforming vectors and/or user channel quality information via the received signals.

5. The system according to claim 4, wherein the one or more circuits are operable to generate the precoding matrix and/or the beamforming matrix based on the received one or more user beamforming vectors and/or user channel quality information.

6. The system according to claim 2, wherein the one or more circuits are operable to transmit data from the generated modified beamforming matrix via the wireless communication medium.

7. The system according to claim 2, wherein the one or more circuits are operable to generate a quantized version of the generated modified beamforming matrix based on a code book.

8. The system according to claim 7, wherein the one or more circuits are operable to transmit data from the quantized version via the wireless communication medium.

9. The system according to claim 7, wherein the one or more circuits are operable to generate the quantized version by computing a correlation value between each matrix element in the generated modified beamforming matrix and each entry value within the code book.

10. The system according to claim 9, wherein the one or more circuits are operable to generate the quantized version based on a computed maximum value for each of the plurality of matrix elements.

11. The system according to claim 10, wherein the one or more circuits are operable to generate an index value, which references a selected entry value within the code book, for each of the plurality of matrix elements based on the plurality of maximum values.

12. The system according to claim 11, wherein the one or more circuits are operable to transmit the plurality of index values via the wireless communication medium.

13. A method for communicating information in a wireless communication system, the method comprising:
generating an interference cancellation matrix that enables a composite signal to be represented as a plurality of subsidiary signals, wherein each of the plurality of subsidiary signals corresponds to a plurality of data stream signals;
generating a precoding matrix based on the generated interference cancellation matrix;
generating a plurality of signals for transmission based on the generated precoding matrix and based on the plurality of data stream signals; and
transmitting the generated plurality of signals via a wireless communication medium.

14. The method according to claim 13, comprising generating a modified beamforming matrix based on the generated precoding matrix and a generated beamforming matrix.

15. The method according to claim 14, comprising generating the generated beamforming matrix and one or more user channel matrices based on signals received via the wireless communication medium.

16. The method according to claim 15, comprising receiving one or more user beamforming vectors and/or user channel quality information via the received signals.

17. The method according to claim 16, comprising generating the precoding matrix and/or the beamforming matrix based on the received one or more user beamforming vectors and/or user channel quality information.

18. The method according to claim 14, comprising transmitting data from the generated modified beamforming matrix via the wireless communication medium.

19. The method according to claim 14, comprising generating a quantized version of the generated modified beamforming matrix based on a code book.

20. The method according to claim 19, comprising transmitting data from the quantized version via the wireless communication medium.

21. The method according to claim 19, comprising generating the quantized version by computing a correlation value between each matrix element in the generated modified beamforming matrix and each entry value within the code book.

22. The method according to claim 21, comprising generating the quantized version based on a computed maximum value for each of the plurality of matrix elements.

23. The method according to claim 22, comprising computing an index value, which references a selected entry value within the code book, for each of the plurality of matrix elements based on the plurality of maximum values.

24. The method according to claim 23, comprising transmitting the plurality of index values via the wireless communication medium.

* * * * *